United States Patent
Cerou et al.

(10) Patent No.: US 8,583,941 B2
(45) Date of Patent: Nov. 12, 2013

(54) COMPUTER CHECKING TOOL

(75) Inventors: Frederic Cerou, Rennes (FR); Teddy Furon, Boistrudan (FR); Arnaud Guyader, Rennes (FR)

(73) Assignee: Inria Institut National de Recherche en Informatique et en Automatique, Chesnay (FR)

( * ) Notice: Subject to any disclaimer, the term of this patent is extended or adjusted under 35 U.S.C. 154(b) by 244 days.

(21) Appl. No.: 13/058,840

(22) PCT Filed: Jul. 10, 2009

(86) PCT No.: PCT/FR2009/000860
§ 371 (c)(1),
(2), (4) Date: May 26, 2011

(87) PCT Pub. No.: WO2010/018313
PCT Pub. Date: Feb. 18, 2010

(65) Prior Publication Data
US 2012/0060061 A1  Mar. 8, 2012

(30) Foreign Application Priority Data
Aug. 13, 2008  (FR) ...................................... 08 04584

(51) Int. Cl.
*G06F 21/00* (2013.01)
(52) U.S. Cl.
USPC ................. 713/193; 726/26; 726/27; 726/32; 713/150; 713/168; 380/201; 380/277; 709/223; 705/3
(58) Field of Classification Search
USPC ....................................... 726/27, 32; 713/193
See application file for complete search history.

(56) References Cited

U.S. PATENT DOCUMENTS

| 2001/0021965 A1* | 9/2001 | Yokota et al. ................. 711/163 |
| 2004/0107356 A1* | 6/2004 | Shamoon et al. ............. 713/193 |
| 2005/0286379 A1* | 12/2005 | Kazami et al. ............. 369/53.21 |
| 2007/0159648 A1* | 7/2007 | Takashima ................... 358/1.14 |
| 2007/0162978 A1* | 7/2007 | Watanabe et al. .............. 726/27 |
| 2008/0137848 A1* | 6/2008 | Kocher et al. ................. 380/201 |
| 2008/0249844 A1* | 10/2008 | Abe et al. ........................ 705/10 |
| 2010/0262684 A1* | 10/2010 | Valois et al. ................. 709/223 |

FOREIGN PATENT DOCUMENTS

WO    2010/018313 A1    2/2010

OTHER PUBLICATIONS

Frederic Cerou et al. Adaptive Multilevel Splitting for Rare Event Analysis; Rapport De Recherche No. 5710; Oct. 2005.
Villen-Altamirano et al. Rare Event Restart Simulation of Two-Stage Networks; European Journal of Operational Research, Amsterdam, NL, vol. 179, No. 1, Nov. 28, 2006; pp. 148-159.

(Continued)

*Primary Examiner* — Morshed Mehedi
(74) *Attorney, Agent, or Firm* — ALG Intellectual Property, LLC

(57) ABSTRACT

A computer checking tool that can repeatedly process a plurality of data sets including data distributed according to a statistical rule may include an estimator that can establish, for a data set, a value characterizing the reproduction of a criterion concerning the data contained therein. The tool may also include a driver that calls the estimator with a plurality of data sets in order to determine a plurality of values, establish a new plurality of sets from the plurality of values, and repeat the estimator call with a new previously established plurality of sets until a condition is verified that involves an extremum of the plurality of values and/or number of repetitions. In addition, the tool may include a mixer that establishes a new set of data on the basis of an existing data set while maintaining the distribution according to the statistical rule.

10 Claims, 4 Drawing Sheets

(56) References Cited

OTHER PUBLICATIONS

Dean T et al. "Splitting for Rare Event Simulation: A Large Deviation Approach to Design and Anlaysis" Stochastic Process and Their Applications Feb. 2009 Elsevier; vol. 119 No. 2, Apr. 8, 2008, pp. 562-587.

Matt L. Miller et al. "Computing the Probability of False Watermark Detection" Lecture Notes in Computer Science, vol. 1768, Jan. 1, 2000, pp. 0302-9743.

Pierre L' Ecuyer et al. "Splitting for Rare-Event Simulation" Winter Simulation Conference, 2006. Proceeding of the, IEEE, PI, Dec. 1, 2006, pp. 137-148.

* cited by examiner

COMPUTER CHECKING TOOL

The invention relates to a computer checking tool for determining rare events.

The field of managing digital rights has experienced especially rapid growth with the development of the Internet. Indeed, this development made it possible to increase the volume of exchanges between remote people, and was accompanied by the need to establish measures to protect copyrights.

Several systems exist that make it possible to manage digital rights. Some systems are based on the addition of "digital locks" to the concerned files, through digital certificates. These solutions are fairly intrusive and pose interoperability problems.

Other systems are based on an analysis of the files to find a particular mark called a watermark, which makes it possible to obtain information inserted into the data of the file itself.

Regarding multimedia files, of the film or music type or other types, watermark marking algorithms have taken off because they are less restrictive for the end user, complex to bypass, and offer good interoperability.

However, these algorithms are not impenetrable, and it is crucial, before adopting them, to know their error rates, i.e. the probability of a false positive (a file is considered marked/protected when it is not), and a false negative (a file is considered not marked/protected when it is).

Determining the probability of false positives is particularly crucial, as it relates to the credibility of the company putting the marking algorithm in place, since users do not appreciate being wrongly accused and not being able to access content they have obtained legally.

There is currently no truly reliable method that is not cost-prohibitive making it possible to test these algorithms to determine the probability of false positives, because that probability is very low.

The invention will improve this situation.

To that end, the invention proposes a computer checking tool that can repeatedly process a plurality of data sets, each data set including data distributed according to a chosen statistical rule.

The tool includes an estimator that can establish, for a data set, a value characterizing the reproduction, by that data set, of a criterion concerning the data contained there, and a mixer that can establish new sets of data on the basis of an existing data set while maintaining the distribution according to the statistical rule.

The tool also includes a driver designed to call the estimator with a plurality of data sets in order to determine a plurality of values, to call the mixer with at least some of the data sets on the basis of a rule based on said plurality of values, and to repeat the estimator call and the mixer call each time with a new plurality of data sets previously established, until a condition is verified that involves an extremum of said plurality of values and/or number of repetitions.

This tool is extremely advantageous because it makes it possible to calculate the probability of a false positive quickly and reliably.

The invention also relates to a computer checking method that can repeatedly process a plurality of data sets, comprising the following steps:
a) providing a function for estimating a data set, characterizing the reproduction, by that data set, of a criterion relative to the data it contains,
b) providing a function for generating random data sets, each data set comprising data distributed according to a statistical input rule,
c) producing a plurality of input data sets while repeatedly calling the generating function,
d) applying the estimation function to at least some of the plurality of input data sets, which yields a plurality of values,
e) selecting a sub-plurality of data sets from said plurality of values, according to a rule based on the plurality of values associated with those sets,
f) establishing a new plurality of data sets through disruptions of the data sets of said sub-plurality,
g) selectively repeating steps d) to g) with the new plurality of data sets each time, until an end-of-iteration condition is verified, which involves an extremum of the value and/or number of iterations.

Other features and advantages of the invention will better appear upon reading the following description, taken from illustrative and non-limiting examples, taken from the drawings, in which.

Figure 1:
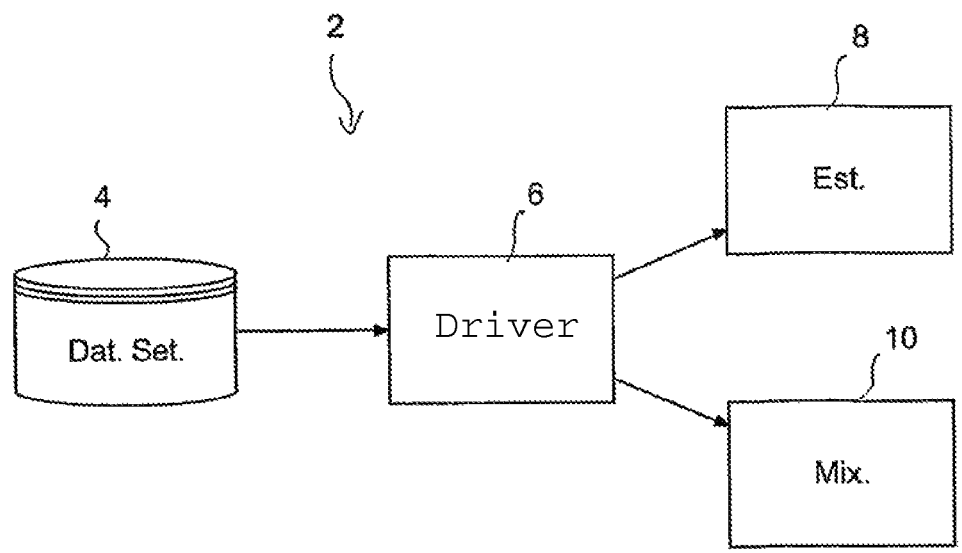
FIG. 1 shows a diagrammatic view of a tool according to the invention.

The drawings and the description below contain, for the most part, elements of a certain nature. They may therefore not only serve to make the present invention better understood, but also to contribute to its definition, if applicable.

This description is of a nature to involve elements subject to droit d'auteur and/or copyright protection. The holder of the rights does not object to the identical reproduction by anyone of this patent document or its specification, as it appears in official files. The holder reserves the rest of its rights in full.

Watermark marking algorithms have many applications today.

One example of an application of these algorithms is protection from copying. In this application, the algorithm is installed on a digital device, for example a camcorder.

The camcorder is arranged to call the algorithm each time content it accesses must be copied/recorded. The algorithm analyzes the data flow of the content and determines whether it is protected. If the content is protected, the camcorder blocks any recording of that content.

In this application, the presence of a false positive is particularly bothersome, because a user filming his vacation will never tolerate losing that content because his camcorder "made a mistake."

Another example of an application of these algorithms is tracing. When a users buys content, it is interesting for the seller to mark the sold copy to be capable of identifying it later.

In this way, if the copy turns up on the Internet, i.e. if the user who purchased it decides to share it illegally on a P2P network, for example, it is possible for the seller to thwart the dishonest user.

Here again, the presence of a false positive is particularly bothersome, because users also do not like to be wrongly accused.

Watermark marking algorithms must be as reliable as possible. To that end, industrialists meet to define standards making it possible to qualify the reliability of these algorithms.

Thus, the Copy Protection Working Group of the DVD Forum consortium established that, in the context of protection from copying, a marking algorithm is reliable as long as a false positive is only detected every 400 hours of video.

In the context of this work, detections are done about every 10 seconds. This requirement therefore defines a false positive probability in the vicinity of about $10^{-5}$.

A reliable experiment to validate this probability would therefore take the analysis of more than 40,000 hours of unmarked film, or more than 4 complete years. This is not feasible.

Tracing applications require comparable reliability, and therefore pose the same problems.

The problem that arises is therefore the ability to determine the probability of rare events (the presence of a false positive) with a reasonable cost.

Works exist in several fields, in particular particle physics (Kahn and Harris 1951), telecommunications (Bayes 1970, Villén-Altamirano and Villén-Altamirano 1994), and air traffic control (Krystul and Blom, 2005). However, these works are based on hypotheses that are not applicable to the field of watermark marking and/or tracing: they assume an intrinsic model of evolution over time that is not valid for the desired application.

Another method is to implement the Monte Carlo method. However, this method is not applicable to this case, because it has a prohibitive calculation cost in light of the desired probabilities.

FIG. 1 shows a diagrammatic view of a tool 2 according to the invention. The tool 2 includes a memory 4, a driver 6, an estimator 8, and a mixer 10.

In the example described here, the tool 2 is a computer. However, the invention is also applicable to all sets of tools or devices able to implement the elements of the tool 2, such as a specialized chip (e.g. of the FPGA type), a generic or specialized printed circuit (e.g. of the ASIC type), an integrated system chip (e.g. of the SOC type), or others.

Moreover, the memory 4 can be made in any way known by those skilled in the art, e.g. in the form of a hard disk, an optical memory of the CD or DVD type, or others, and is not necessarily physically assembled with the other elements of the tool 2. Thus, the memory 4 can be accessed by network, or by any other means known by those skilled in the art.

Moreover, the estimator 8 and the mixer 10 described here are software elements that are physically stored on the memory 4 and that are called and implemented by the driver 8. As such, these elements can be parameterized or updated as needed.

However, these elements could be functions etched in a chip forming the tool 2, or have physical and/or logic locks to prevent modification thereof.

The tool 2 operates by applying a multilevel Monte Carlo method algorithm. This algorithm is based on the general principle of:
  determining the scores of a population relative to a measurement function;
  selecting the elements of the population that have a score above a given value; and
  replacing the other elements with random elements, and starting again.

As will better appear in the following, modifications and other subtleties are contributed to this general principle.

Thus, the tool 2 operates by dividing a main problem (finding extremely rare events reliably and in a short time) into a multitude of simpler, but correlated problems (finding less rare events, and sorting the most favorable among them), as explained by the following formula:

$$P(A_N) = P(A_N|A_{N-1}) * P(A_{N-1}|A_{N-2}) * \ldots * P(A_2|A_1) * P(A_1)$$

where the $A_1$ are overlapping events.

To date, the adaptive multilevel Monte Carlo method has not been applied to the field of detecting/generating rare events. The only known article related thereto is a theoretical article: "*Adaptative multilevel splitting for rare event analysis*" by Cérou and Guyader, 2007, Stochastic Analysis and Applications, Vol 25, issue 2, pp. 417-443.

In that article, an adaptive approach is proposed to gradually define the levels of the multilevel Monte Carlo method, which is applied to a case where the sets of data or elements are dynamic.

"Dynamic" refers to the fact that these elements are trajectories that evolve continuously over time according to an intrinsic model of evolution given by the physical nature of the studied problem.

The trajectories are simulated and repeatedly selected to choose those offering the best score, i.e. the sequences reaching a maximum state over the observation period. The replacement step consists of replacing the lower score elements with the minimum of the higher score elements.

This article is primarily a mathematical demonstration of the feasibility and reliability of the adaptive multilevel Monte Carlo method in the limited context where the elements have a dynamic fixed by the nature of the studied problem. Like the older works mentioned above, this article assumes the presence of an intrinsic model of evolution over time that we do not have here, and therefore cannot be applied as such.

The problem of the application of this algorithm to the problems described above is that it is complex to replace the elements having an insufficient score satisfactorily.

This is due primarily to the fact that the populations associated with the problems described above have different statistical characteristics. In fact, in this context, the multilevel Monte Carlo method seems, a priori, not to be very suitable, and difficult to implement.

Indeed, the step for replacement with new elements that, on one hand, respect the particular statistical characteristics and, on the other hand, form favorable starting points for finding other rare events conditioned by the high score events, is particularly complex to implement.

Figure 2:
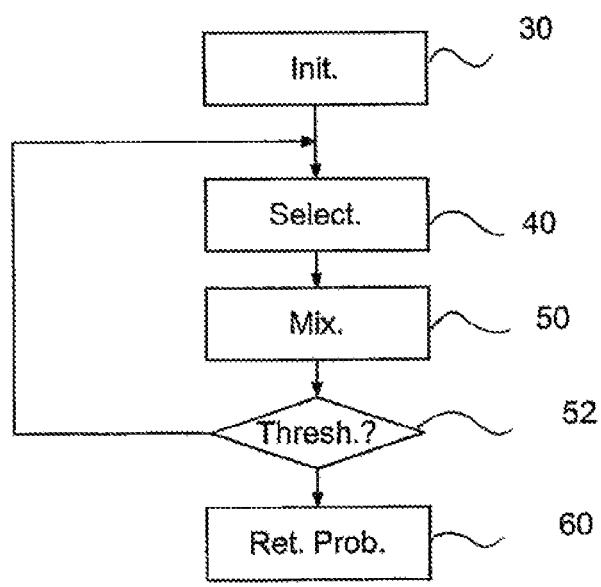
FIG. 2 shows a general operating diagram of the tool of FIG. 1.

FIG. 2 shows a diagrammatic view of the operation of the tool 2. As shown in that figure, the tool starts from an initialization operation 30. Then, it performs a loop that comprises a selection operation 40, a mixing operation 50, and ends with an end-of-loop condition 52. Lastly, as output from the loop, an operation 60 sends back the rare event probability just calculated.

The sought rare event is defined as being the fact that an element distributed according to a distribution law imposed by the studied problem has a score above a certain threshold.

Operations 30 to 60 will now be described in more detail with examples of embodiments shown in FIGS. 3 to 6.

Figure 3:
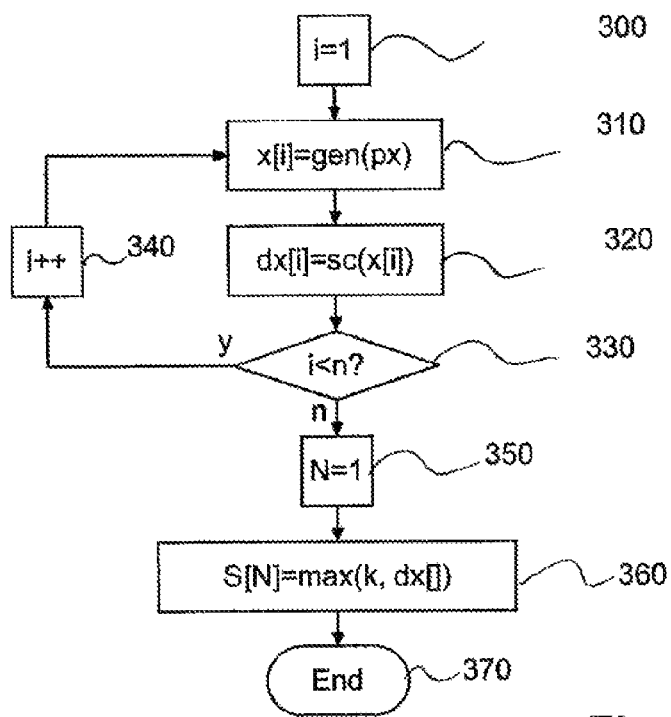
FIGS. 3 to 6 show examples of particular implementations of the operations of FIG. 2.

FIG. 3 shows an example embodiment of the operation 30 of FIG. 2.

This function of this operation is the initialization of the elements that will serve to determine the rare event probability, as well as the initialization of the first adaptive level.

In step 300, a counter i is initialized at 1. A loop then begins, which includes the repetition of an element generating operation 310, and an operation 320 for calculating the score of the element generated in operation 310. An end-of-loop condition 330 determines whether or not the counter i has reached the number of elements n one wishes to simulate simultaneously. When this is not the case, the counter i is incremented in 340 and the loop starts again.

In operation 310, a gen( ) function receives a statistical rule px as argument to generate an element x[i]. In operation 320, the element x[i] just generated is transmitted as argument to a function sc( ) that determines that element's score. This score is stored in an element dx[i].

In one particular embodiment of the invention, an element x[i] is a pointer towards digital content or a sub-part of digital content such as a rectangular selection of a fixed image, a sound tape portion between two given moments, or an image extracted from a video film.

The function gen( ) of the operation 310 randomly takes digital content of this type, from a large set of content made available to the invention, as well as a randomly chosen portion of said content.

In this embodiment, the function sc( ) of the operation 320 is a measurement of the likelihood of the fact that the digital content indicated by the pointer x[i] contains the watermark sought.

In another particular embodiment of the invention, an element x[i] is a binary word of several bits identifying users of a content sales service.

The function gen( ) is the algorithm used by that service to create and assign these identifiers. In this embodiment, the function gen( ) ensures that a given identifier is only assigned to a single user of the service.

The function sc( ) is a measurement of the likelihood of the fact that the identifier x[i] has been used to create a copy illegally redistributed on a data exchange network.

In the example described here, x[ ] is a table that receives the successive elements used to determine/generate an element that respects the statistical rule px and is a rare event relative to the measuring law that the function sc( ) represents.

Like x[ ], dx[ ] is a table that stores all of the scores of the elements of x[ ] in a given simulation iteration.

Numerous embodiments are possible for x[ ] and dx[ ] other than tables, and those skilled in the art will recognize them. Examples include stacks, or lists, or naming convention variables.

Moreover, although operations 310 and 320 have been described in the same loop, they could be executed in separated loops.

At the output of this initialization loop, a simulation iteration counter N is initialized at 1 in an operation 350. Then, the first level S[N] (N=1) is established by a function max( ) in an operation 360.

The function max( ) receives the current score table dx[ ] and a selection parameter k in argument, and sends the $k^{th}$ highest score from the table dx[ ]. As will be seen below, the parameter k is the number of elements that are kept for the following iteration, the n-k other elements being withdrawn.

The function max( ) can be implemented in various ways. One effective exemplary embodiment is to sort the table dx[ ] by decreasing values, and to recover the value of the $k^{th}$ element.

Other embodiments are possible, such as the use of a table dx[ ] sorted directly, or the use of an algorithm not sorting the table dx[ ] and directly determining the $k^{th}$ highest score.

Once the function max( ) is finished, the initialization operation 30 ends in 370.

Figure 4:
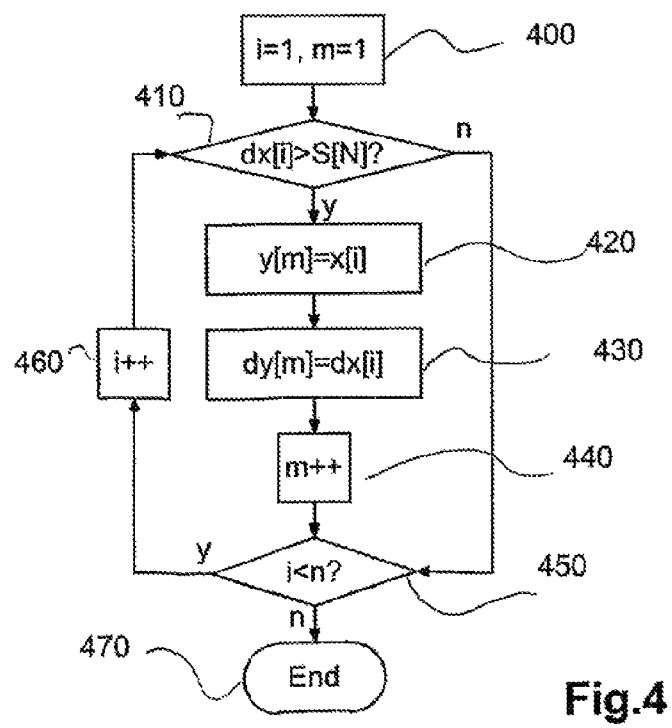

FIG. 4 shows an exemplary embodiment of operation 40 of FIG. 2.

This operation performs the first part of each iteration, i.e. the selection of the k best elements that will serve as a basis for the mixing of operation 50.

Operation 40 therefore starts from an operation 400 in which a counter i and a counter m are initialized at 1. Then, in an operation 410, a test determines whether the element x[i] has a corresponding score dx[i] higher than the threshold of the current level S[N].

If this is the case, in an operation 420, this element is copied in a table y[ ] as element y[t]. Likewise, in an operation 430, the score dx[i] of this element is copied in a table dy[ ] as element dy[t]. Lastly, in 440, the counter t is incremented.

Then, or when the score of element dx[i] of element x[i] is strictly below the current threshold S[N], a test 450 determines whether all of the elements x[i] have been covered. When this is not the case, the counter i is incremented in 460. Otherwise, the operation ends in 470.

It will be noted that, through the definition of the threshold S[N] as the $k^{th}$ highest score of dx[ ], the table y[ ] contains exactly k elements. These k elements will serve as a base in operation 50 for mixing and convergence of the algorithm.

Figure 5:
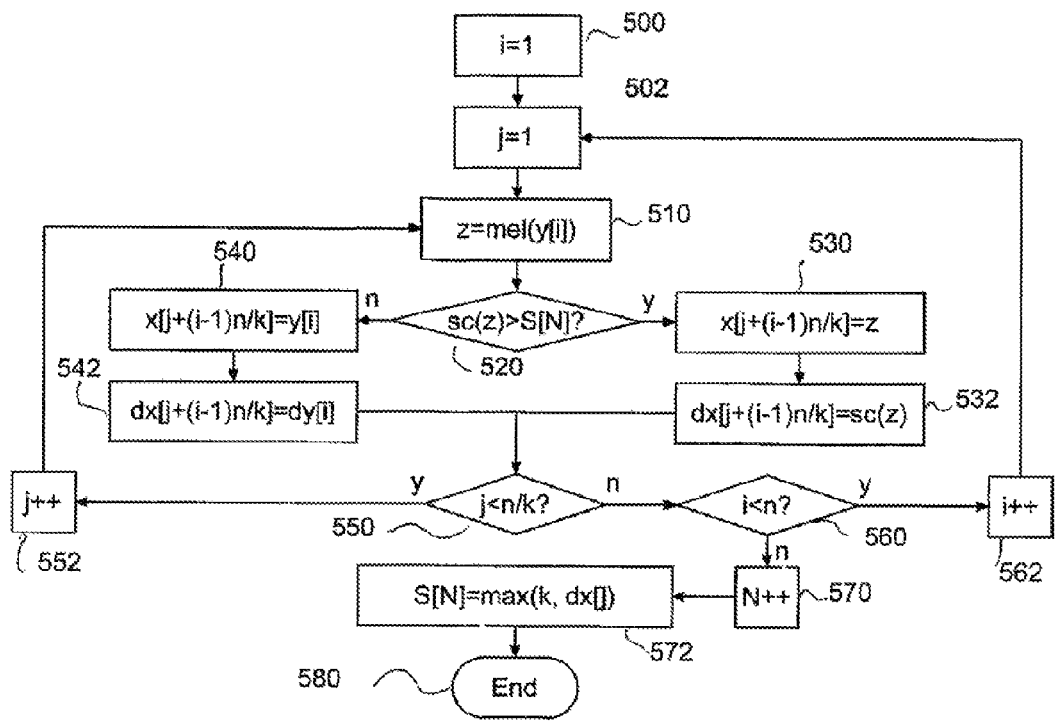
Figure 6:
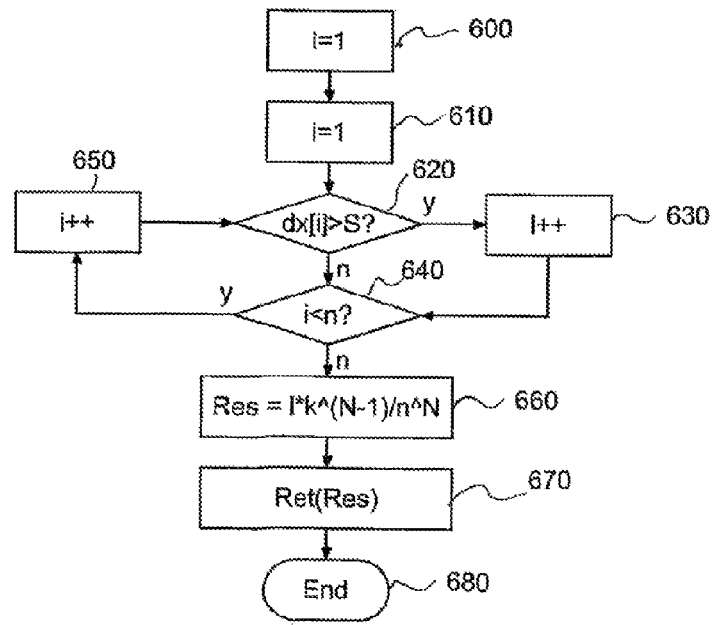

FIG. 5 shows an exemplary embodiment of operation 50 of FIG. 2.

Operation 50 is a loop that starts from elements selected from table y[ ], and that will mix or disrupt each of its elements a number of times in the vicinity of n/k. This mixing aims to "move" the elements so as to converge toward a more rare element. To ensure this convergence, part of this operation ensures that the score of the "mixed" elements progresses, and once again only the mixed elements that have a favorable score are kept. Otherwise, they are replaced by the corresponding non-disrupted element.

Figure 7:
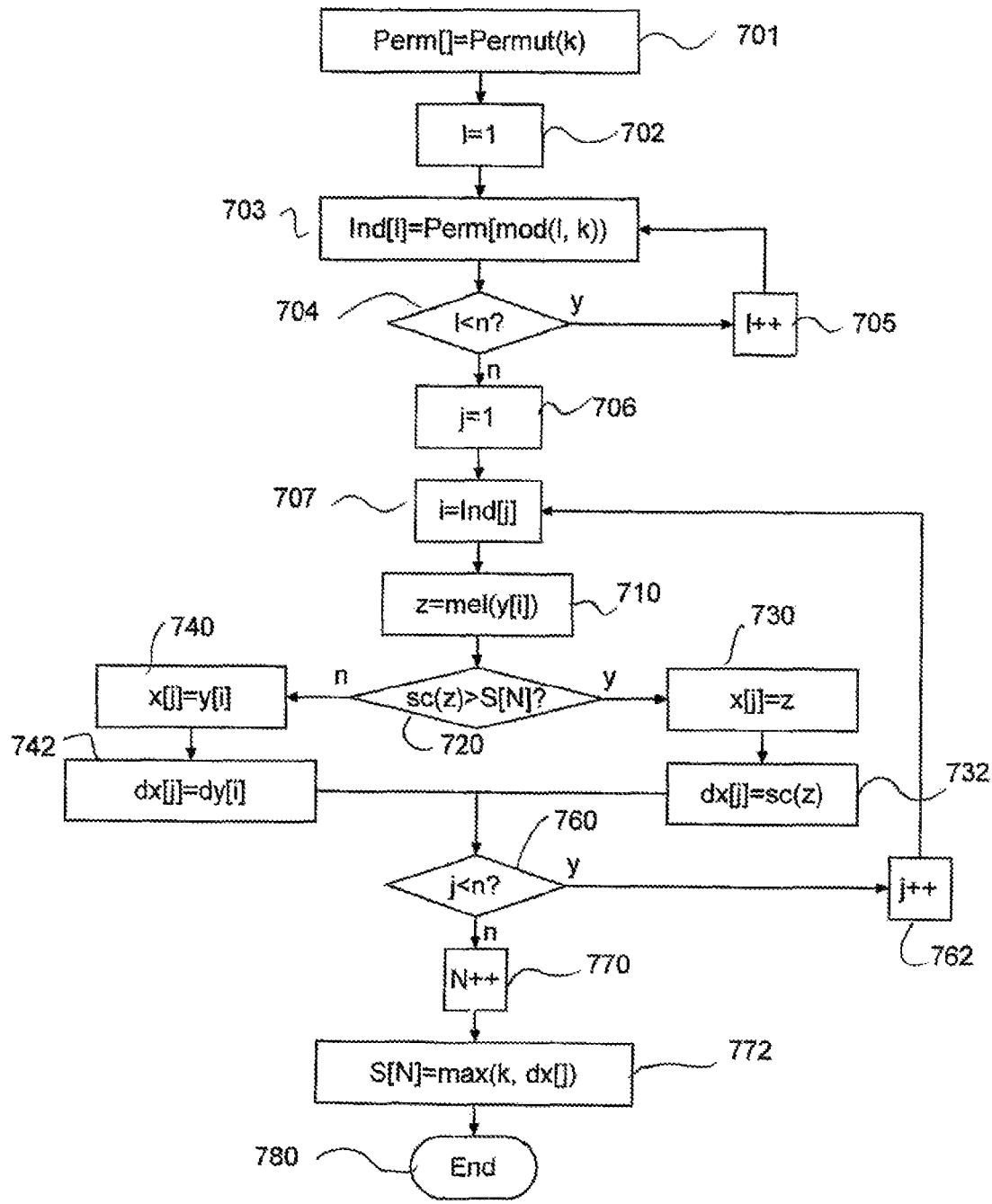
FIG. 7 shows another embodiment of an operation of FIG. 2.

Moreover, the embodiment described here assumes that k divides evenly into n, i.e. n/k is an integer. FIG. 7 shows an alternative that does away with this limit.

Operation 50 here comprises two main loops:
a first loop that makes a counter i increase to successively mix the elements of the table y[ ];
a second loop, which is internal to the first loop, to mix each element of y[i], n/k times, and to keep the best mixed elements.

The operation 50 therefore starts in 500 by setting the counter i at 1. It is followed in 502 by putting counter j at 1.

The second loop then begins with a first disruption of the element y[i] in 510. This disruption is done using a function mel( ) that receives y[i] as argument and calls the mixer 10 with that argument as well as with a parameter μ controlling the force of the disruption.

In return, the mixer 10 sends a new element z, which is a random disruption of the element y[i], which nevertheless keeps the same statistical rule px as the x[i]. In fact, element z is located, in the space of the possibles, in the neighborhood of the element y[i]. The size of this neighborhood depends on the force of the disruption, and can therefore be controlled with the parameter μ.

One example of this disruption can easily be given with a base population whereof the distribution follows the Gaussian law.

Then, the mixer can be a Gaussian noise generator, with an intensity given by the parameter μ to ensure sufficient movement to explore the space of the possibles, but not excessive to remain useful. In this example, this Gaussian noise is added to the element y[i], the sum then being standardized to find a Gaussian law with the same variance as the elements x[i].

For other statistical rules, other embodiments are possible. It may also be possible to use a generic mixer based on the Metropolis-Hastings law (see for example the work "*Monte Carlo: concept, algorithms and applications*" by G. Fishman, Springer-Verlag, New York, 1996), which makes it then compatible with most of the statistical rules respected by the elements x[i].

In the case of an embodiment of the invention based on digital content, the mixer modifies the digital content in a random, but controlled, manner. For example, the mixer can be one of the processes described in the scientific article "Stochastic Image Warping for Improved Watermark Desynchronizaiton," by Angela D'Angelo, Mauro Barni, and Neri Merhav, which appeared in the review EURASIP Journal on Information Security, Volume 2008 (2008), Article ID 345184, doi: 10.1155/2008/345184.

More simply, if y[i] is a pointer towards a portion of a digital content, the mixer randomly modifies the selection of the content: for example, on a sound tape, the passage selected by the new pointer z is offset by µ microseconds, randomly backward or forward relative to the passage selected by y[i].

Once the element y[i] is thus mixed, the value of the score of the element z, sc(z), is calculated and compared to the threshold of the current level S[N] in an operation 520.

If sc(z) is greater than S[N], then the mixed element is higher performing than the original element y[i], i.e. more rare.

Then, in an operation 530, the element of x[ ] with index j+(i−1)*n/k, which corresponds to the global index of the $j^{th}$ iteration of the second loop in the $i^{th}$ iteration of the first loop, is replaced by z. In operation 532, the element of dx[ ] with the same index is also replaced by sc(z).

If sc(z) is less than S[N], then the mixed element is lower performing than the original element y[i], i.e. less rare.

Then, in operation 540, the element of x[ ] with index j+(i−1)*n/k, which corresponds to the global index of the $j^{th}$ iteration of the second loop in the $i^{th}$ iteration of the first loop, is replaced by y[i], i.e. y[i] is duplicated. In operation 542, the element of dx[ ] with the same index is also replaced with dy[i].

Then, in operation 550, one verifies whether the second loop is finished, i.e. whether the element y[i] of the $i^{th}$ iteration of the first loop has been replicated n/k times.

If this is not the case, the counter j is incremented in 552, and the second loop resumes in 510, with mixing again of the current element y[i].

If the second loop is finished, it is verified in operation 560 whether all of the elements of y[ ] have been covered, i.e. if it is the end of the first loop. When this is not the case, the counter i is incremented in operation 562, and the first loop restarts with the new counter i in 502.

If all of the elements of y[ ] have been covered, then in operation 570 the level counter N is incremented, and in 572 the threshold of the current level is defined identically to operation 360.

Lastly, operation 50 ends in 580, with the call of the end-of-iteration condition 52. This condition is double here:
if the threshold of the current level S[N] is above the stop threshold S, i.e. the sought rare event has been detected; or
if the level counter N is above a maximum number of iterations.

The second condition makes it possible to prevent the algorithm from looping indefinitely in case of non-convergence due to incorrect parameterization. To date, the Applicant has nevertheless not observed any non-convergence of the algorithm implemented by the tool 2.

If operation 50 is carefully analyzed, it is therefore shown that the tool 2 has a very particular adaptation to the problems posed by the rare events related to marking and tracing.

Indeed, as already mentioned above, contrary to the text of the article "*Adaptative multilevel splitting for rare event analysis*," the studied events are not characterized by any dynamic evolution that favors the convergence of the algorithm.

The tool 2 offsets this gap in several ways:
each favorable element of a given iteration is disrupted n/k times in the following iteration, which makes it possible to take into account that the sought false positives are fairly specific;
this disruption is specific to the statistical rule observed by the elements;
the value of the parameter µ controlling the disruptive force during implementation of the mixer as well as the size of the neighborhood in which the element output from the mixer is situated relative to the element input into the mixer is either chosen by the user of the invention, or set adaptively for each iteration of the invention;
only the highest performing mixed elements are kept—otherwise they are replaced by the element of y[ ] that they came from—which accelerates the convergence; and
all of the elements are mixed, including the y[i] of the preceding iteration, which makes it possible to create the dynamic that does not exist in the phenomena observed due to their very nature.

Moreover, the value of the parameter µ can be modified automatically during the iterations, which then makes the dynamic thus created variable.

Once the convergence iterations towards the rare event are finished, operation 60 returns the exact probability associated with the concerned iterations, which is therefore an estimator of the probability sought.

Operation 60 thus starts in 600 with the initialization of a counter 1, and continues in 610 with the initialization of another counter i.

The principle is to cover the x[i] established in the last iteration to determine the number thereof that is above the threshold S, which is one of the two conditions for stopping the iterations.

Thus, for each x[i] such that dx[i] is greater than S, the counter 1 is incremented in 630, and in 640 one tests whether all of the x[i] have been covered. If this is not the case, then the counter i is incremented in 650 and the operation 620 is repeated with the following element x[i].

Thus, when all of the x[i] have been covered, it is known whether or not the iterations stopped due to non-convergence according to the value of 1.

Indeed, if at the end of this loop, 1 is less than k, then a certain number of rare events have been found, but not all with a score greater than t with the probability $(k/n)^{\wedge}(N-1)$.

The probability Res=1*$k^{\wedge}(N-1)/n^{\wedge}N$. Indeed, as seen with the formula of the multilevel Monte Carlo method, the probability Res associated with the $(N-1)^{th}$ level is the product of the conditional probabilities of the preceding levels, or $(k/n)^{\wedge}(N-1)$, by the conditional probability of the $N^{th}$ level, or 1/N.

Lastly, operation 60 ends in 680.

As just shown, we have thus sequentially built increasingly rare events relative to the measuring function sc( ), each event respecting the basic statistical rule px.

Moreover, it will be noted that the elements of x[ ] of the last iteration give examples of such events.

FIG. 7 shows another example embodiment of the operation 50. In this embodiment, k does not divide evenly into n, and operation 50 is no longer done by overlapping of two loops, but follows the same mixing reasoning of the y[i] with selection of the best elements.

Thus, the operation starts in 701 with the generation of a permutation table of the integers between 1 and k. This table is the result of a function Permut( ) that receives the integer k as input, and randomly generates a table whereof each element comprises an integer between 1 and k, each element being present a single time in Perm[ ].

Then, a loop starts in which the random table Perm[ ] is used to fill a table of indices Ind[ ] that will be used for mixing of the y[i].

More precisely, the loop starts by initializing a counter 1 at 1 in 702, and continues in 703 by filling the element Ind[l] with the value of Perm[mod(l,k)], where mod(l,k) is the module function, which returns the rest of the division of l by k.

Then, in 704, it is tested whether the index table Ind[ ] has been filled. If it has not, 1 is incremented in 705 and the filling loop resumes in 703. Otherwise, the mixing of the y[i] then starts with the initialization in 707 of a counter j at 1.

A loop is then launched to mix the y[i] and select the best elements, with in 708, the index i that receives the value of Ind[j].

Then, the operations 710, 720, 730, 732, 740 and 742 are done identically to operations 510, 520, 530, 532, 540 and 542, except that the index j replaces the index j+(i−1)n/k due to the new manner of mixing.

This loop is conditioned by a test 760 on j to see if elements remain to mix. In that case, the counter j is incremented in 762 and the loop resumes in 707.

In the contrary case, the operation 50 ends with operations 770, 772 and 780 identical to operations 570, 572 and 580.

This embodiment is particularly interesting, because it is no longer necessary for k to divide evenly into n, and the same state of mind is kept as for operation 50 of FIG. 5, as the y[i] are replicated on average n/k times using operations 701 to 707.

This therefore makes it possible to better parameterize the tool 2 by choosing a number n and a number k wisely.

The Applicant's experiments have demonstrated that a relatively low number of elements, for example n=12800, made it possible to provide extremely satisfactory results.

Two other parameters aside from n control the convergence and its quality:
  parameter k, which determines the number of elements rejected in each iteration;
  parameter μ, which determines the exploration that is done in the space of the possibles.

Thus, the closer k is to n, the higher the precision of the tool, but at the same time the slower the convergence, since few elements are rejected.

The Applicant has observed the following facts:
  a ratio k/n=9/10 is very precise, but slow;
  a ratio k/n=1/2 is relatively less precise, but very fast; and
  a ratio k/n=3/4 is a good compromise that yields good quality and a fairly fast convergence, but with some variations in the number of iterations necessary to converge.

In parallel, the Applicant has also observed that:
  a low μ is not good for the convergence, because the space of the elements is not correctly explored in the first iterations of the invention;
  a high μ tends to make the algorithm diverge because it mixes the y[i] "too much" in the last iterations.

Alternatively, the invention provides a method for setting the value of the parameter μ automatically. Too high a value results in rejecting many elements z during operation 520 (or 720).

The invention then too often goes through operations 540 and 542 (740 and 742, respectively) at the expense of operations 530 and 532 (730 and 732, respectively).

In this alternative, a counter calculates how many times the invention has gone through 540 (740, respectively) during operation 50. At the end of operation 50, if this counter is above a certain fraction of n (e.g. 0.7*n), then operation 50 is cancelled because it is interpreted as an indication that the parameter μ is too strong.

Parameter N is then not incremented, tables x[ ] and dx[ ] as well as all of the counters of operation 50 are reset to zero. Parameter μ is decreased by a chosen percentage, e.g. 10%.

Operation 50 then restarts with this new value of μ. This is done until the counter is below the fraction of n mentioned above, thereby ensuring that the disruptions are done, i.e. operations 530 and 532 (730 and 732, respectively), a comfortable number of times.

Lastly, the maximum number of iterations was limited to N=100. In practice, very few cases have generated a stop due to this limit.

The probabilities sought in the context of the tracing issues are in the vicinity of $10^{-12}$.

This means that a simulation using the traditional Monte Carlo method would require a number in the vicinity of $10^{12}$ sortings in the best of cases to obtain reliable results.

As a comparison, for n=12800 and k=9600, the tool 2 converges towards a solution with about $10^6$ sortings. The results are therefore exceptional.

In order to ensure the reliability of the operation done by the tool 2, and owing to the considerable gains obtained owing to the latter, it is even possible to use the tool 2 a hundred times with the same parameters.

It is then observed that the latter is extremely stable, and that it converges with a relatively constant number, to within one or two iterations. This therefore also makes it possible to establish a trust interval for the tool 2.

On the other hand, the intermediate thresholds stored in the table S[ ] can be used. They provide an estimate of the curve that associates a threshold with a rare event probability, giving approximate points on that curve: threshold S [i] for a probability $(k/n)^i$.

During the creation of the marking detector, it is important to give the threshold after which a higher likelihood measurement forces the detector to decide on the presence of the marking.

Likewise, during the creation of a dishonest user tracer, it is important to provide the threshold after which a higher likelihood measurement will cause the tracer to accuse the suspected client.

In both cases, the thresholds should be set so that the probability of false positives (detecting marking when it is not there, or accusing an innocent person) is below a certain data from the specifications.

The table S[ ] makes it possible to find a first approximation of the desired threshold. In this use of the invention, the threshold S defining the rare event is voluntarily defined with a very high value, so that the maximum number of iterations is done, which yields maximum data.

In this type of application, it is for example possible to first choose a ratio k/n equal to 1/2 to quickly obtain an approximation of the threshold, and then start again with a ratio k/n of 3/4 and with this approximation of the threshold, to reliably confirm the probability of a false alarm.

One example of implementation of the tool described above is to place it onboard on a marking or tracing detection device, to make it possible to verify the proper operation thereof.

Such a device can operate by returning a scalar value where the size qualifies the suspected presence of marking or tracing. Other devices may return a binary value, indicating the suspected presence of marking or tracing. Other devices will operate with other types of values.

It would also be possible to make the tool accessible remotely or by a physical connection to that type of device, instead of making it onboard.

The invention claimed is:

1. A computer-implemented checking tool that is able to repeatedly process a plurality of data sets, each data set comprising data distributed according to a chosen statistical rule, the tool comprising:
   an estimator that is able to establish, for a data set, a value characterizing a criterion concerning data contained in the data set;
   a driver designed to call the estimator with a plurality of data sets in order to determine a plurality of values and to establish a new plurality of data sets on the basis of the plurality of values, wherein the driver repeats the estimator call each time with a new plurality of data sets previously established until a condition is verified that involves an extreme of the plurality of values and/or number of repetitions;
   a mixer that is able to establish a new data set on the basis of an existing data set while maintaining the distribution according to the chosen statistical rule;
   at least one hardware processor;
   wherein the driver is designed to call the mixer with at least a subset of the data sets as a function of a rule based on the plurality of values associated with the subset;
   wherein the rule includes the selection of data sets with the highest associated value;
   wherein the criterion of the estimator concerns the presence of a marking or tracing in the data set.

2. The tool according to claim 1, wherein the mixer comprises a function for disrupting the selected data sets.

3. The tool according to claim 2, wherein the mixer is designed to repeatedly call at least a subset of the selected data sets.

4. The tool according to claim 3, wherein the mixer is designed to call the estimator with the new data set and to replace the new data set with the data set from which the new data set is taken according to a rule based on the values associated with the data sets.

5. The tool according to claim 4, wherein the rule includes replacing the new data set with the data set from which the new data set is taken when the value associated with the set is greater than the value associated with the new data set.

6. A computer checking method that is able to repeatedly process a plurality of data sets, comprising the following steps:
   a) providing an estimation function for characterizing a criterion related to data contained in the data set;
   b) providing a function for generating random data sets, each data set comprising data distributed according to a statistical input rule;
   c) producing a plurality of input data sets while repeatedly calling the generating function;
   d) applying the estimation function to at least a subset of the plurality of input data sets to produce a plurality of values;
   e) selecting a sub-plurality of data sets from the plurality of values as a function of a rule based on the plurality of values associated with the sub-plurality;
   f) establishing a new plurality of data sets through disruptions of the data sets of the sub-plurality;
   g) selectively repeating steps d) to g) with the new plurality of data sets each time until an end-of-iteration condition is verified, wherein the end-of-iteration condition comprises an extreme of the value and/or number of iterations;
   wherein the rule of step e) comprises the selection of data sets with the highest associated value;
   wherein the criterion of step a) concerns the presence of a marking or tracing in the data set.

7. The method according to claim 6, wherein step f) comprises:
   f1) calling a disrupting function with at least part of the data set of the sub-plurality to produce disrupted data sets reproducing the distribution of the data according to the chosen statistical rule.

8. The method according to claim 7, wherein step f) comprises:
   f2) calling the estimation function with at least a subset of the disrupted data sets and establishing the new plurality of data sets from a rule based on the comparison of the values associated with the data sets of the sub-plurality and the disrupted data sets.

9. The method according to claim 8, characterized in that the rule of step f2) comprises the selection, between a data set of the sub-plurality and a disrupted data set taken from the data set, of data sets whereof the associated value is highest.

10. The method according to one of claims 6, wherein step f) is repeated several times for at least a subset of the data sets of the sub-plurality.

* * * * *